United States Patent

[11] 3,602,280

| [72] | Inventors | Halbert R. Hill;<br>Garfield C. Siverson, both of Harris County, Tex. |
|---|---|---|
| [21] | Appl. No. | 825,228 |
| [22] | Filed | May 16, 1969 |
| [45] | Patented | Aug. 31, 1971 |
| [73] | Assignee | Moore & Stephenson, by said Hill Houston, Tex.<br>part interest to each |

[54] VEGETABLE PEELER
4 Claims, 3 Drawing Figs.

| [52] | U.S. Cl. | 146/50 |
|---|---|---|
| [51] | Int. Cl. | A23n 7/02 |
| [50] | Field of Search | 146/50; 134/144 |

[56] References Cited
UNITED STATES PATENTS

| 1,997,849 | 4/1935 | Bargar | 134/144 X |
|---|---|---|---|
| 3,158,187 | 11/1964 | Smith et al. | 146/50 |

FOREIGN PATENTS

| 848,625 | 9/1960 | Great Britain | 134/144 |

*Primary Examiner*—Willie G. Abercrombie
*Attorney*—Pravel, Wilson & Matthews

ABSTRACT: An apparatus for cleaning and peeling large quantities of vegetables, such as potatoes or the like, in a continuous operation comprising a trough formed of a plurality of rotatable rollers having brushes and polishing means thereon with a movable pressurized spray positioned thereabove for spraying such vegetables to remove the peelings therefrom.

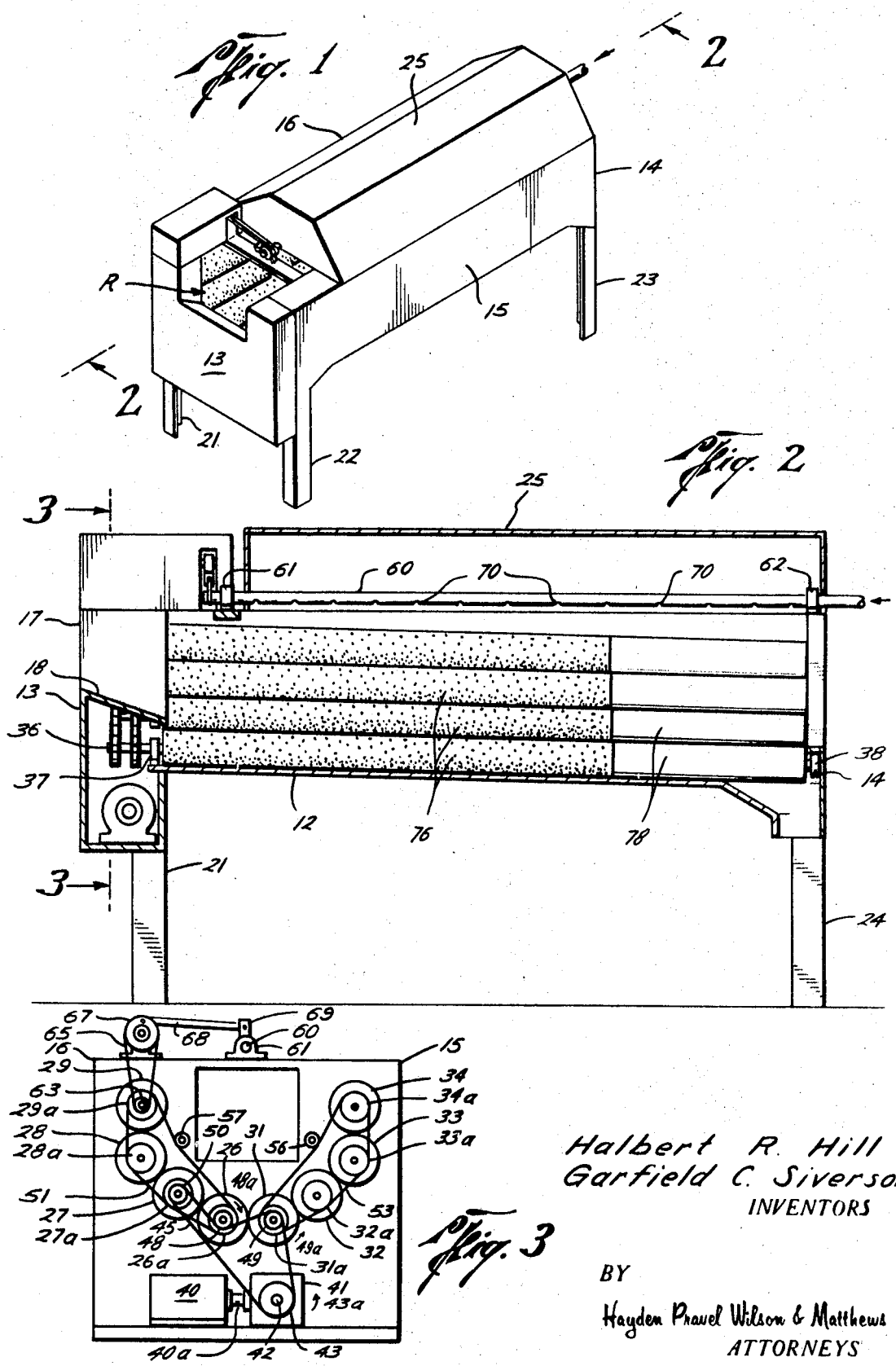

VEGETABLE PEELER

BACKGROUND OF THE INVENTION

1. Field of the Invention

The present invention relates to a new and improved vegetable cleaner and polisher of a type suitable for processing large quantities of raw vegetables such as potatoes, in a continuous operation suitable for commercial food-processing uses wherein the vegetable processor washes, peels and polishes raw vegetables in a continuous, uninterrupted operation.

2. Description of the Prior Art

There are many various mechanical vegetable scrubbers and peelers, such as potato peelers, which are in the prior art that include containers having an abrasive inner wall surface in which the vegetables are rotated or tumbled so that the abrasive material on the wall of the container will remove the peels from the potatoes or other vegetables. While this type of apparatus will remove vegetable peels, it requires frequent stopping to load and unload the machine after each load has been peeled and therefore has the disadvantage of being incapable of a substantially continuous operation such as is desirable in commercially processing large quantities of fresh or raw vegetables.

SUMMARY

Briefly, the present invention relates to a new and improved vegetable processing or peeling apparatus for peeling a large volume of fresh or raw vegetables in a continuous operation comprising an inclined trough formed of a plurality of rotatable rollers and having an overhead high-pressure water spray apparatus extending longitudinally of the trough for spraying water or other washing or cleaning fluid onto the vegetables being processed as they move through the processing tough for removing the peeling from the vegetables, such rollers having a brush portion and a relatively smooth roller portion thereon for polishing the peeled vegetables as they tumble along the trough of the present invention.

An object of the present invention is to provide a new and improved vegetable processor having a plurality of rollers disposed in a housing which forms a longitudinally extending trough which can be inclined to a desired angle for feeding a continuous stream of vegetables along the trough whereby such vegetables are peeled and polished and wherein the present invention includes a high-pressure spray means extending longitudinally of the trough and adapted to be oscillated or reciprocated thereabove for washing such vegetables and removing the peels from the vegetables as they are moved therealong.

BRIEF DESCRIPTION OF THE DRAWING

FIG. 1 is an isometric view showing the apparatus of the present invention;

FIG. 2 is a longitudinal sectional view taken on line 2—2 of FIG. 1 showing details of construction of the present invention; and FIG. 3 is a sectional view taken on line 3—3 of FIG. 2 showing details of the drive apparatus of the present invention.

DESCRIPTION OF THE PREFERRED EMBODIMENT

Briefly, the apparatus of the present invention which is designated P in FIG. 1 of the drawings, comprises a housing H in which is disposed a plurality of longitudinally extending rollers R which are arranged to form a U-shaped trough as will be described in detail hereinafter. A high-pressure spray apparatus S is positioned above the trough and extends longitudinally thereof for spraying the vegetables as they move therealong to remove the peeling from the vegetables.

Considering now the apparatus of the present invention in more detail, the housing H in FIG. 1 of the drawings comprises an oblong container having a bottom 12 with a perimeter wall formed of a front end 13, a rear end 14 and upstanding sides 15 and 16 which extend around the perimeter of the bottom 12. The front end 13 is provided with an opening 17 having an inwardly and downwardly inclined chute or ramp 18 which is provided to facilitate the passage of raw vegetables through the opening 17 and direct them toward the rollers R. The rear end 14 is also provided with an opening 19 for removing the peeled vegetables out of the housing H after they have passed along the rollers R.

Legs 21, 22, 23 and 24 are provided at the four corners of the housing H. Preferably, the front legs 21 and 22 are adjustable and can be lengthened or shortened to raise or lower the front end 13 and thereby set the rollers R at a desired angle of inclination to feed the vegetables through the housing H at a desired flow rate. A removable hood 25 is provided on the housing H to cover the rollers R and prevent mist or fluid from the high-pressure spray apparatus S from escaping from the housing H.

The plurality of longitudinally extending rollers, designated generally R in FIG. 1 of the drawing, are arranged to form a U-shaped trough which extends longitudinally of the housing H. As best seen in FIG. 3 of the drawing, four rollers 26, 27, 28 and 29, are disposed on the left side of the housing H and four rollers 31, 32, 33 and 34 are disposed on the right side of the housing H. As shown in FIG. 2 of the drawing, each of such rollers is carried on a longitudinally extending shaft 36 journaled in suitable bushings 37 and 38 at its opposite ends. Also, all of the rollers are substantially parallel to the bottom 12 and extend from the front opening 17 to the rear opening 19.

The rollers R are rotated by means of a drive motor 40 that is connected by a shaft 40a to a gearbox 41, having an output shaft 42 on which is mounted a primary drive sprocket or pulley 43. The primary drive pulley or sprocket 43 is connected by means of a belt or chain 45 for driving the intermediate drive sprockets 48 and 49 which are connected to the innermost rollers 26 and 31, respectively. As shown, the belt or chain 45 is looped around an idler gear or sprocket 50 that is carried on the end of the shaft on which the roller 27 is mounted so as to drive the sprockets 48 and 49 in opposite directions of rotation, as indicated by the arrows 48a and 49a.

The intermediate drive sprocket 48 is operably connected by a belt or chain 51 to roller-drive sprockets or pulleys 26a, 27a, 28a and 29a that are connected to the rollers 26, 27, 28 and 29, respectively. Similarly, the intermediate drive sprocket 49 is operably connected by a chain or belt 53 to the roller drive sprockets or pulleys 31a, 32a, 33a and 34a that are connected to the rollers 31, 32, 33 and 34, respectively. Thus, when the primary drive sprocket 43 is rotated in a counterclockwise direction as indicated by the arrow 43a, the chain or belt 45 drives the intermediate drive sprocket 49 in a counterclockwise direction and the intermediate drive sprocket 48 in a clockwise direction. The rollers 26, 27, 28 and 29 which are connected to the intermediate sprocket 48 by the chain or pulley 51 are also rotated in a clockwise direction and, similarly, the rollers 31, 32, 33 and 34 that are connected by means of the belt or chain 53 to the drive sprocket 49 are rotated in a counterclockwise direction. Thus, as the vegetables or potatoes or the like are moved along the trough T the oppositely rotating banks of rollers R will tend to channel the moving vegetables toward the middle of the trough and tumble them therealong from the front end 13 to the rear end 14. The drive belts or chains 51 and 53, respectively, are tensioned by suitable idler gears or idler pulleys 56 and 57 as shown in FIG. 3 of the drawing.

As best seen in FIG. 2 of the drawing, the rollers 26, 27, 28 and 29 are provided with bristles 76 on the portion of the rollers adjacent the upper end and the lower end portion of the rollers is provided with a smooth surface 78 which may be formed of hard rubber or other suitable material. Also, it will be appreciated that the rollers 31, 32, 33 and 34 on the right side of the housing H are also provided with an upper bristle portion and a lower smooth surface portion such as those shown in FIG. 2. Further, the relative portions of each roller which are covered with bristles 77 and that which is formed of a smooth surface material 78, may be varied according to the particular vegetables being processed or depending upon the type of finish which is desired upon the finished vegetables after they have been peeled.

The high-pressure spray apparatus S includes a longitudinally extending pipe or tube 60 that is connected to a suitable source of high-pressure fluid such as a pump (not shown). The pipe or manifold 60 is journaled in suitable bearings 61 and 62 that are carried on the housing H. The tubular member 60 is rotated or oscillated by means of a drive apparatus including a drive sprocket or pulley 63 which is provided on the drive pulley or sprocket 29a and is connected by means of a belt or pulley 65 to a driven sprocket 67 that is operably connected by means of a linking arm 68 to an arm 69 secured to one end of the tubular member 60 to thereby oscillate tubular member 60 back and forth as the rollers R in the housing H are rotated. It will be appreciated that the manifold 60 may be reciprocated longitudinally of the rollers R rather than oscillated, if desired.

Such tubular member 60 is provided with spaced openings having nozzles 70 therein that are spaced longitudinally on the manifold so that the high-pressure fluid conducted through the tubular member 60 will be discharged through the nozzles 70 to spray the vegetables which are on the rollers R therebelow and remove the peelings therefrom by the force of the spray contacting the vegetables. The nozzles 70 are arranged to spray a fan-shaped pattern or configuration with the plane of the spray extending traversely relative to the rollers R. Such high-pressure fluid will be discharged at about 500 to 5,000 p.s.i.

In using the apparatus of the present invention, potatoes or other raw vegetables may be poured or channeled into the opening 17 in the face of the front end 13 and fed down the chute 18 onto the rotating brushes or rollers R which will cause such vegetables to tumble or roll therealong while being sprayed by the high-pressure fluid discharged from the overhead nozzles 70 in the tubular member or manifold 80. As the vegetables are tumbled therealong, the rollers R will tumble the vegetables to thereby expose all their surfaces to the high-pressure fan spray for removing the peels therefrom. Thereafter the smooth surface portion 78 of the rollers R will smooth or polish the outer surface of such vegetables prior to the vegetables being discharged through the opening in the rear end 14 of such housing H.

The foregoing disclosure and description of the invention are illustrative and explanatory thereof, and various changes in the size, shape and materials as well as in the details of the illustrated construction may be made without departing from the spirit of the invention.

What we claim is:

1. A vegetable-processing apparatus for washing, peeling and polishing of vegetables, comprising:
   a. a housing;
   b. said housing having a vegetable-inlet opening formed in a first portion thereof for receiving the vegetables to be processed;
   c. said housing having a vegetable-outlet opening formed in a second portion thereof for removing the processed vegetables;
   d. high-pressure spray means for spraying the vegetables to wash and peel such vegetables;
   e. a plurality of rollers mounted in said housing for moving the vegetables with respect to said high-pressure spray means;
   f. means for rotating said rollers;
   g. said rollers having a bristle portion extending along a portion of said rollers adjacent said inlet opening;
   h. said bristle portion rolling and tumbling the vegetables being processed during movement of said rollers to thereby expose the surfaces of the vegetables to said high-pressure spray means;
   i. said rollers further having a smooth surface portion extending along a portion of said rollers adjacent said outlet opening;
   j. said smooth surface portion smoothing and polishing the outer surfaces of the peeled vegetables during movement of said rollers prior to the vegetables being discharged through said outlet opening wherein the incoming vegetables are peeled and polished as such vegetables are moved with respect to said high-pressure spray means by said rollers.

2. The invention of claim 1 wherein said high-pressure spray means includes a fluid manifold extending longitudinally of said rollers, a source of high-pressure fluid connected to said manifold and nozzle means in said manifold for discharging said high-pressure fluid on to the rollers.

3. The invention of claim 2 wherein said nozzle means includes means for discharging said high pressure in a fan-shaped pattern.

4. The structure of claim 1, wherein:
   a. said rollers comprise:
      1. a first group of rollers disposed on a first side of said housing; and
      2. a second group of rollers disposed on a second side of said housing opposite said first side, said groups of rollers being arranged to form a trough;
   b. said means for rotating said rollers comprises:
      1. means for rotating said first group of rollers in a first direction; and
      2. means for rotating said second group of rollers in a second direction, opposite the first direction, whereby the vegetables are moved towards the middle of the trough and are tumbled by said rollers during movement of the vegetables through said housing.